United States Patent [19]
Sugiyama et al.

[11] Patent Number: 5,580,498
[45] Date of Patent: Dec. 3, 1996

[54] METHOD OF PRODUCING CONTACT LENS WITH IDENTIFYING MARK PERMEATING INTO LENS

[75] Inventors: Akihisa Sugiyama, Ichinomiya; Kazuharu Niwa; Shigeo Mochizuki, both of Nagoya, all of Japan

[73] Assignee: Menicon Co., Ltd., Japan

[21] Appl. No.: 314,434

[22] Filed: Sep. 28, 1994

Related U.S. Application Data

[63] Continuation of Ser. No. 27,757, Mar. 8, 1993, abandoned.

[30] Foreign Application Priority Data

Mar. 13, 1992 [JP] Japan .................................... 4-089630

[51] Int. Cl.$^6$ .................................................... B29D 11/00
[52] U.S. Cl. ............................ 264/1.7; 264/2.6; 264/2.7
[58] Field of Search ............................ 264/1.7, 2.7, 2.6

[56] References Cited

U.S. PATENT DOCUMENTS

| | | | |
|---|---|---|---|
| 4,145,125 | 3/1979 | Chika | 351/165 |
| 4,194,814 | 3/1980 | Fischer et al. | 351/160 R |
| 4,447,474 | 5/1984 | Neefe | 427/164 |
| 4,898,695 | 2/1990 | Doshi | 264/2.7 |
| 5,034,166 | 7/1991 | Rawlings | 264/1.7 |

FOREIGN PATENT DOCUMENTS

| | | |
|---|---|---|
| 0030577 | 6/1981 | European Pat. Off. . |
| 0390443 | 10/1990 | European Pat. Off. . |
| 0480049 | 4/1992 | European Pat. Off. . |
| 62-73228 | 4/1987 | Japan . |
| 1-60804 | 12/1989 | Japan . |
| 2180364 | 3/1987 | United Kingdom . |

OTHER PUBLICATIONS

Week 8738, Derwent Publications Ltd., London, GB; AN 267630 & JP-A-62 186 221 (Tome Sangyo KK) Aug. 14, 1987.

Week 9215, Derwent Publications Ltd., London, GB; AN 118039 & JP-A-4 057 980 (Showa Denko) Feb. 25, 1992.

*Primary Examiner*—James Derrington
*Attorney, Agent, or Firm*—Parkhurst, Wendel & Burr, L.L.P.

[57] ABSTRACT

A method of producing a contact lens provided with an identifying mark is disclosed. According to this method, a printing liquid is first prepared by dissolving a pigment in an organic solvent which is permeable into a lens material for the contact lens. This printing liquid is applied to a predetermined portion of a lens surface of the contact lens, such that the printing liquid permeates into an interior of the lens, thereby to form a colored region on the lens surface. The colored region thus formed consists of a first portion permeating into the interior of the lens, and a second portion protruding from the lens surface. Then, the second portion of the colored region is removed so as to smooth the lens surface, whereby the identifying mark is constituted by the first portion of the colored region.

10 Claims, 1 Drawing Sheet

METHOD OF PRODUCING CONTACT LENS WITH IDENTIFYING MARK PERMEATING INTO LENS

This is a continuation of application Ser. No. 08/027,757 filed Mar. 8, 1993, now abandoned.

BACKGROUND OF THE INVENTION

1. Field of the Invention

The present invention relates to a method of producing a contact lens, which has an identifying mark or indicia such as characters, figures or symbols, or which is partially colored or dyed.

2. Discussion of the Prior Art

Conventionally, hard contact lenses (including gas-permeable hard contact lenses), hydrophilic soft contact lenses or the like have been fabricated by cutting a lens block or blank formed of a suitable lens material into the configuration of a lens, and then finishing the lens by polishing so that the lens obtained has dimensions which meet with a predetermined standard. According to a generally known method, the lens block is initially machined and polished to form a back surface of the lens, to which a special purpose jig is then bonded. With the jig fixed to a lathe, the lens block is further machined and polished to form a front surface of the lens. Thereafter, the lens thus worked is detached from the jig, to thereby give an ophthalmic contact lens.

Some contact lenses produced in the manner as described above have identifying marks or indicia formed in preselected portions of their lens surfaces. The marks include characters, figures, symbols or others, which may permit or facilitate a differentiation between front and back surfaces of the lens or between lenses for left and right eyes, or which may specify the optical qualities of the lens. As specific methods for marking a contact lens, it has been known to use a laser to engrave marks in the lens surface, as disclosed in U.S. Pat. No. 4,194,814, or to deposit on the lens surface a stamp which is impregnated with a printing liquid containing a pigment or dye, as disclosed in JP-B2-1-60804. It has also been known to dye or color a preselected portion of the lens by immersing the lens in a dyeing solution prepared from a water soluble dye and a solvent, with the lens portions other than the preselected portion being covered with a jig, and then drying the lens, as disclosed in JP-A-62-73228.

The marked contact lens produced in the manner as described above tends to suffer from contaminants or dirt attached to its marked region, since the marked region forms a minute recess or protrusion on its lens surface. In the above-described laser-marking technique, for example, the contaminants are likely to enter the marks or craters formed in the lens surface. Further, the formation of the craters results in an undesirably reduced strength of the contact lens which normally has a considerably small thickness. In the marking technique using the pigment or dye, on the other hand, an organic solvent which is usually used for preparing a solution of pigment or dye causes swelling of the marked region of the lens surface to which the solution is applied, whereby the lens surface is made uneven or rough. In this case, contaminants tend to accumulate at the corners formed by the flat portions and protruding or recessed portions of the lens surface. Thus, the conventional marked contact lens is likely to suffer from contaminants accumulated on its marked region, possibly causing irritation of the eye of a lens wearer, for example.

SUMMARY OF THE INVENTION

It is therefore an object of the present invention to provide a method for forming an identifying mark on a preselected portion of a lens surface of a contact lens with high visibility and clearness, while assuring a comparatively high degree of evenness or smoothness of a marked region of the lens surface which bears the mark.

The above object may be attained according to the principle of the present invention, which provides a method of producing a contact lens provided with an identifying mark in the form of character, figure or symbol, comprising the steps of: (a) preparing a printing liquid by dissolving a pigment in an organic solvent which is permeable into a lens material for the contact lens; (b) applying the printing liquid to a predetermined portion of a lens surface of the contact lens, such that the printing liquid permeates into an interior of the lens, thereby to form a colored region on the predetermined portion, the colored region consisting of a first portion permeating into the interior of the lens, and a second portion protruding from the lens surface; and (c) removing the second portion of the colored region so as to smooth the lens surface, whereby the identifying mark is constituted by the first portion of the colored region.

According to the method of present invention as described above, the printing liquid is applied to the lens surface of the contact lens so as to form a colored region corresponding to a desired mark on the lens surface, such that the colored region consists of the first portion permeating into the interior of the lens, and the second portion protruding from the lens surface. Therefore, the second protruding portion is removed so as to make the lens surface even or smooth, by polishing the relevant lens surface after provision of the colored region, while leaving the first permeating portion below the lens surface. Thus, the first portion of the colored region provides the desired mark having sufficiently high visibility or clearness. Since the mark thus formed yields substantially no recess and protrusion, the contact lens is advantageously free from contaminants attached to such marked region, effectively eliminating the problem of irritation of the eye of the lens wearer, for example.

The present method of marking a contact lens may be incorporated into an ordinary machining and polishing method for producing the lens. Namely, the above-described method of the invention may further include the steps of: machining a lens block formed of the lens material so as to form the lens surface, prior to application of the printing liquid to the predetermined portion of the lens surface; and polishing the lens surface to thereby remove the second portion of the colored region. In this case, the whole process of producing a contact lens can be advantageously simplified, assuring a significantly enhanced production efficiency.

In one preferred form of the present invention, the printing liquid is applied to the predetermined portion of the lens surface, through a screen which is deposited on the lens surface, the screen being patterned in the form of the identifying mark to be formed. This screen-marking technique can easily provide a considerably clear mark which is free from blurs.

BRIEF DESCRIPTION OF THE DRAWINGS

The above and optional objects, features and advantages will be better understood by reading the following description of a preferred embodiment of the present invention, when taken in conjunction with the accompanying drawings in which:

FIG. 1(a) and FIG. 1(b) are fragmentary views for explaining the process of marking a contact lens according to the method of the present invention, wherein FIG. 1(a) shows the contact lens having a mark formed thereon by applying a printing liquid to the lens, and FIG. 1(b) shows the contact lens having a substantially even or smooth surface formed by polishing.

DETAILED DESCRIPTION OF THE PRESENT INVENTION

Figure 1A:
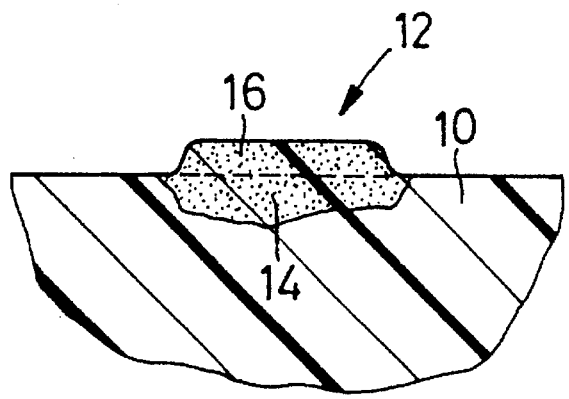

The above-described method according to the present invention may be employed for manufacturing various kinds of contact lenses formed of suitable lens materials as indicated below, which can be machined and polished as described later. Generally, the present method is employed for producing a hard contact lens or a hydrophilic soft contact lens. More specifically, the hard contact lens may be: a known hard contact lens formed of a polymer material prepared from a monomer composition which contains methyl methacrylate or the like as a major component; and an gas-permeable hard contact lens formed of a polymer material prepared from a monomer composition which contains as a major component siloxanyl methacrylate, siloxanyl styrene, fluoroalkyl methacrylate, fluoroalkyl styrene or the like. The hydrophilic soft contact lens may be formed of a polymer material prepared from a monomer composition which contains as a major component hydroxyethyl methacrylate, N-vinylpyrrolidone, dimethylacrylamide, polyvinyl alcohol or the like.

The printing liquid used for practicing the method of the present invention is prepared by mixing a pigment with an organic solvent capable of dissolving the pigment and permeating deep enough into the above-indicated lens material, and dissolving the pigment in the solvent. According to the method of the invention, an identifying mark is eventually constituted only by a colored portion of the lens where the printing liquid permeates into the lens interior. Therefore, it is particularly desirable to enable the pigment to permeate as deep as possible into the interior of the lens, so as to form visible and clear marks on the lens. To this end, a suitable pigment and organic solvent having sufficiently high permeability should be selected for use in the printing liquid.

Namely, the organic solvent to be selected is required to dissolve a pigment (dye) to a sufficiently large extent, and exhibit a sufficiently high permeability with respect to the above-described lens materials for contact lenses. More specifically, the organic solvent may be selected from o-dichlorobenzene, 1,4-dioxane, toluene, methyl ethyl ketone, p-xylene, tetrahydrofuran (THF), chloroform, acetone, ethanol and others, or from polymeric organic solvents such as methyl acrylate, methyl methacrylate, ethyl acrylate, and ethyl methacrylate. Of these organic solvents, o-dichlorobenzene, 1,4-dioxane, toluene, methyl ethyl ketone, p-xylene, chloroform, acetone, methyl acrylate, methyl methacrylate, ethyl acrylate, ethyl methacrylate and tetrahydrofuran (THF) are preferably used for practicing the present invention, in view of particularly high permeability thereof. If there is a possibility of elution of the pigment, it is desirable to prepare the printing liquid by using one of the above-indicated polymeric organic solvents, and polymerize and harden the printing liquid after it is applied to the lens surface of a contact lens, thereby to prevent the elution of the pigment.

On the other hand, the pigment (dye) to be selected is required to exhibit a sufficiently high permeability with respect to the above-described lens materials for contact lenses. For example, oil-soluble dyes such as C.I. Solvent Blue 36, C.I. Solvent Blue 63, C.I. Solvent Green 3, C.I. Solvent Violet 13, and C.I. Solvent Red 111 are preferably used for practicing the present invention, in view of relatively high permeability thereof. Of these dyes, C.I. Solvent Blue 36 (1,4-Bis(isopropylamino) anthraquinone), C.I. Solvent Blue 63 (1-Methylamino-4-m-tolylaminoanthraquinone) and C.I. Solvent Violet 13 (1-Hydroxy-4-p-toluinoanthraquinone) have particularly high permeability, and may be suitably used in combination with a selected one of the above-indicated 12 kinds of organic solvents having particularly high permeability, so as to provide a printing liquid having an excellent permeability. The thus selected pigment (dye) is usually added in an amount of about 1–20 parts by weight per 100 parts by weight of the organic solvent.

To the printing liquid obtained by mixing the organic solvent and pigment (dye) and dissolving the pigment in the solvent, there is preferably added a binder which serves to increase the viscosity of the printing liquid, prevent the volatilization of the organic solvent and make the printing liquid easy to handle. For example, ethyl cellulose, silicone oil, or polyethylene glycol may be used as the binder. Among these, ethyl cellulose is particularly preferred in order to assure a sufficiently high permeability of the printing liquid. The thus selected binder is usually added in an amount of about 0–50 parts by weight per 100 parts by weight of the organic solvent.

When the polymeric organic solvent is used for preparing the printing liquid, a polymerization initiator for polymerizing the polymeric organic solvent is added to the printing liquid. This polymerization initiator may be suitably selected from various known radical polymerization initiators such as azobisisobutyronitrile and 2,2'-azobis (2,4-dimethylvaleronitrile), and photopolymerization initiators such as benzoyl peroxide, benzoin ethyl ether, and 2-hydroxy-2-methyl-1-phenylpropane-1-on. Each of the polymerization initiators may be used in either alone or in combination with one or more of the other initiators. The amount of the polymerization initiator is usually held in a range of about 1–15 parts by weight per 100 parts by weight of the whole printing liquid.

By using the thus prepared printing liquid and the lens materials as described above, the method of the present invention may be carried out in the following procedure, by way of example, so that an identifying mark is provided on the front surface of a contact lens. In this embodiment, a screen or mask is used when the printing liquid is applied to the appropriate lens surface.

(1) Initially, a lens block formed of an appropriate lens material is prepared. With the lens block being fixed to a lathe, the lens block is machined to form a back surface of a contact lens to be produced, and then finished by polishing so that the back surface is dimensioned to conform to a predetermined standard of the lens.

(2) Then, the lens block is bonded at the finished back surface to a special purpose jig, and is further machined to form a front surface of the lens with the jig being fixed to a lathe.

(3) Subsequently, a suitably patterned screen or mask which consists of a polyester film, nylon film or the like is deposited on a peripheral portion of the front surface of the contact lens, such that the screen adheres to the lens surface.

The screen has perforations which correspond to an identifying mark to be made, such as characters, figures or symbols. Then, the printing liquid is applied via the screen to the lens surface, in a predetermined pattern which corresponds to the perforations of the screen.

(4) This condition is retained for a suitable period of time (for about 15 sec. to 3 min.), so that the printing liquid permeates deep enough into the interior of the lens. Then, the screen is removed from the contact lens. If necessary, the printing liquid may be polymerized and hardened according to a known method, by heating or irradiation of ultraviolet rays.

(5) In this manner, a marked region 12 is formed on the peripheral portion of the front surface of the contact lens 10, as shown in FIG. 1(a), such that the marked region 12 consists of a permeating colored portion 14 which has permeated into the interior of the lens 10, and a protruding colored portion 16 which appears on the surface of the lens 10.

Figure 1B:
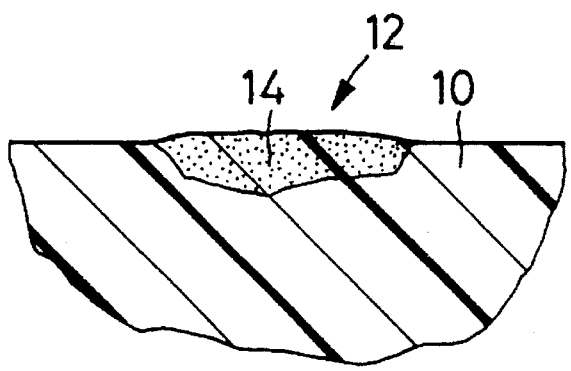
Figure 2:
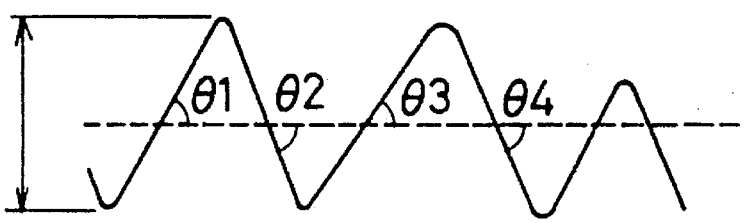
FIG. 2 is a view showing in enlargement a part of a marked region of a contact lens, for which the surface roughness was measured.

(6) Thereafter, the contact lens 10 with the marked region 12 formed thereon is set on a polishing machine, and the front surface of the lens, which includes the peripheral portion and an optical portion, is polished with a suitable abrasive. Consequently, the marked region 12 is made even or flush with the lens surface, that is, the projecting colored portion 16 is eliminated while the permeating colored portion 14 is left or kept within the lens 10, as shown in FIG. 1(b). Thus, the front surface of the contact lens 10 is finished so as to conform to the predetermined lens standard.

(7) Then, the contact lens 10 is detached from the polishing machine.

The contact lens obtained in the above-described procedure is provided with a visible and clear mark which is constituted by the permeating colored portion of the marked region which has permeated into the interior of the lens. Since the lens surface is made substantially even by removal of the protruding colored portion, the thus obtained contact lens is free from contaminants conventionally accumulated in the marked region, thereby effectively preventing irritation of the eye of a lens wearer, for example. When the present marking method is incorporated into an ordinary cutting and polishing method for producing a contact lens as in the above procedure, that is, when the contact lens is marked after the cutting step for cutting the lens out, and is then finished in the following polishing step, the whole process for producing the contact lens is advantageously simplified, resulting in significantly enhanced production efficiency. If the printing liquid is applied to the lens surface through the screen, as in the above embodiment, the mark formed on the lens is clear and distinctive, and is kept from running or spreading.

It is to be understood that the above-described procedure of producing a contact lens is just one embodiment of the method of the present invention, and that the present method may be carried out in various other procedures. For example, the cutting and polishing operations are initially effected on the front surface of the contact lens, followed by the cutting, marking and polishing operations on the back surface of the lens. In the meantime, the manner of applying the printing liquid to the contact lens is not limited to the above-described screen marking technique using a patterned screen or mask, but may be selected from various other known techniques, such as a pad marking technique using a stamp which is impregnated with a printing liquid and deposited on the lens surface.

EXAMPLES

To clarify further the concept of the present invention, there will be described some examples produced according to the method of the present invention. However, it is to be understood that the present invention is by no means limited to the details of these examples, but may be embodied with various changes, modifications and improvements, which may occur to those skilled in the art, without departing from the scope of the invention as defined in the appended claims.

Initially, appropriate pigment and binder were weighed as indicated in TABLE 1 below. Then, the weighed pigment and binder were mixed with an organic solvent, or a polymeric liquid prepared by adding 5% by weight of a polymerization initiator to a monomer. The resulting mixture was kneaded well until powders of the pigment and binder were dissolved in the organic solvent or polymeric liquid. In this manner, 26 kinds of printing liquid (No. 1 through No. 26 in TABLE 1) were prepared.

TABLE 1

| No. | PIGMENT (DYE) *1 | Parts by weight | ORGANIC SOLVENT | Parts by weight | BINDER | Parts by weight |
|---|---|---|---|---|---|---|
| 1 | Solvent Blue 63 | 0.5 | o-dichlorobenzene | 3 | ethyl cellulose | 0.3 |
| 2 | Solvent Green 3 | 0.5 | | | | |
| 3 | Solvent Green 3 | 0.5 | methyl methacrylate (V-65) *2, *3 | 3 | ethyl cellulose | 0.3 |
| 4 | Solvent Green 3 | 0.5 | ethyl acrylate (V-65) *2, *3 | 3 | ethyl cellulose | 0.3 |
| 5 | Solvent Blue 63 | 0.3 | 1,4-dioxane | 3 | ethyl cellulose | 1 |
| 6 | | | acetone | 3 | | |
| 7 | | | toluene | 3 | | |
| 8 | | | p-xylene | 3 | | |
| 9 | | | methyl ethyl ketone | 3 | | |
| 10 | | | chloroform | 3 | | |
| 11 | | | tetrahydrofuran | 3 | | |
| 12 | | | ethyl acrylate (HMP) *2, *4 | 3 | | |
| 13 | | | methyl methacrylate (V-65) *2, *3 | 3 | | |
| 14 | Solvent Violet 13 | 0.3 | 1,4-dioxane | 3 | ethyl cellulose | 1 |
| 15 | | | acetone | 3 | | |
| 16 | | | toluene | 3 | | |
| 17 | | | p-xylene | 3 | | |
| 18 | | | methyl ethyl ketone | 3 | | |
| 19 | | | chloroform | 3 | | |

TABLE 1-continued

| No. | PIGMENT (DYE) *1 | Parts by weight | ORGANIC SOLVENT | Parts by weight | BINDER | Parts by weight |
|---|---|---|---|---|---|---|
| 20 | | | tetrahydrofuran | 3 | | |
| 21 | Solvent Blue 63 | 0.3 | acetone | 3 | ethyl cellulose | 0.3 |
| 22 | | | methyl ethyl ketone | 3 | | |
| 23 | | | toluene | 3 | | |
| 24 | Solvent Violet 13 | 0.3 | acetone | 3 | ethyl cellulose | 0.3 |
| 25 | | | methyl ethyl ketone | 3 | | |
| 26 | | | methanol | 3 | | |

*1 Each pigment is designated by C.I. Name.
*2 Polymerization initiator for the above organic solvent
*3 XI-65: 2,2'-azobis (2,4-dimethylvaleronitrile)
*4 HMP: 2-hydroxy-2-methyl-1-phenylpropane-1-on As lens materials for contact lenses, there were prepared Copolymer I, Copolymer II, Copolymer III and Copolymer IV having respective compositions as indicated below. A lens block formed of each lens material was machined and polished by an ordinary method, to form a back surface of a contact lens to be produced. Then, the back surface of the lens is bonded to a special purpose jig, which is in turn fixed to a lathe, and the lens block is further machined to form a front surface of the lens. In this manner, a number of test specimens of contact lens were prepared.

| Copolymer I | |
|---|---|
| tris(trimethylsiloxy)silyl-propyl methacrylate | 45 parts by weight |
| hexafluoroisopropyl methacrylate | 35 parts by weight |
| methacrylic acid | 5 parts by weight |
| N-vinylpyrrolidone | 5 parts by weight |
| ethylene glycol dimethacrylate | 10 parts by weight |
| Copolymer II | |
| tris(trimethylsiloxy)silyl styrene | 45 parts by weight |
| hexafluoroisopropyl methacrylate | 35 parts by weight |
| methacrylic acid | 5 parts by weight |
| N-vinylpyrrolidone | 5 parts by weight |
| ethylene glycol dimethacrylate | 10 parts by weight |
| Copolymer III | |
| tris(trimethylsiloxy)silyl styrene | 35 parts by weight |
| trifluoroethyl methacrylate | 35 parts by weight |
| methyl methacrylate | 15 parts by weight |
| methacrylic acid | 5 parts by weight |
| N-vinylpyrrolidone | 5 parts by weight |
| ethylene glycol dimethacrylate | 5 parts by weight |
| Copolymer IV | |
| hexafluoroisopropyl(tris(trimethyl-siloxy)silyl-propyl fumarate | 70 parts by weight |
| methacrylic acid | 5 parts by weight |
| N-vinylpyrrolidone | 20 parts by weight |
| ethylene glycol dimethacrylate | 5 parts by weight |

Subsequently, a nylon screen (having a mesh of 350), which was patterned in the form of numerals as a mark that represents the base curvature of lens, was adhered to the front surface of each test specimen of contact lens prepared. Then, a selected one of the above printing liquids was deposited on the screen on the lens so as to cover its patterned portion. After this condition was retained for about one minute, the screen was removed from the lens, only to leave the mark on the lens. In this test, the printing liquids No. 1 through No. 4 were applied to the contact lenses prepared from the above-indicated Copolymer I, and the printing liquids No. 5 through No. 20 were applied to the lenses prepared from Copolymer II. Further, the printing liquids Nos. 21–23 were applied to the lenses prepared from Copolymer III, and the printing liquids Nos. 24–26 were applied to the lenses prepared from Copolymer IV. The printing liquids Nos. 3, 4 and 13 applied to the respective contact lenses were polymerized and hardened by heating, while the printing liquid No. 12 applied to the relevant lens was polymerized and hardened by irradiation of ultraviolet rays.

Each of the contact lenses thus provided with the mark was set on a polishing machine while being fixed to the jig, so that the peripheral portion of its front surface was first polished for two minutes by means of abrasives, and then the optical portion was polished for two minutes. Thus, the front surface of the contact lens was smoothed or made even. Then, the contact lens with the jig was put into a mass of a detaching liquid, so that the lens was detached from the jig. At this time, it was found that all of the contact lenses thus obtained were given respective marks with sufficiently high clearness or vividness.

To examine the roughness of the lens surface with respect to the contact lenses marked by application of the printing liquids Nos. 5, 12 and 13, the difference ($\mu$m) between the highest and lowest points on the marked region of the lens surface and the average angle ($\theta$) of inclination of the marked region were measured, using a probe-type surface-roughness measuring instrument called "Form Talysurf (available from Taylor-Hobson Co.)". The results of the measurements are indicated in TABLE 2. For comparison, the same measurements for the surface roughness were conducted on two kinds of contact lenses commercially available, which were provided with marks by the known laser-marking technique. The measurement results are also indicated in TABLE 2.

It will be understood from TABLE 2 that the marks formed in the contact lenses produced according to the present invention yield considerably small roughness, with significantly reduced inclination on the marked region, as compared with the marks formed in the commercially available contact lenses (comparative examples 1 and 2). This means that the contact lens produced according to the present invention can be provided with a mark with sufficiently high clearness or vividness, without suffering from contaminants attached to the marked region of the lens surface, thereby avoiding the irritation of the eye lid of the lens wearer, for example.

TABLE 2

| | Roughness of marked region *1 (μm) | Average angle of inclination of marked region (°) |
| --- | --- | --- |
| Printing liquid No. 5 | 2.779 | 0.1 |
| | (6.710)*2 | (3.4)*2 |
| Printing liquid No. 12 | 2.126 | 0.2 |
| | (5.040)*2 | (2.6)*2 |
| Printing liquid No. 13 | 1.797 | 0.2 |
| Comparative Example 1 *3 | 15.713 | 9.1 |
| Comparative Example 2 *3 | 10.424 | 13.0 |

*1 Difference between highest and lowest points on marked region
*2 When measured just after marking and before polishing
*3 Commercially available

What is claimed is:

1. A method of producing a hard contact lens adapted to be placed in direct contact with eye tissue, said hard contact lens being provided with an identifying mark in the form of a character, figure or symbol, comprising the steps of:

preparing a printing liquid by dissolving a pigment in an organic solvent which is permeable into a lens material for the hard contact lens;

machining a lens block to form a lens body having front and back surfaces;

applying said printing liquid to a predetermined portion of one of said front and back surfaces of the contact lens body, such that the printing liquid permeates into an interior of the lens body thereby to form a colored region on said predetermined portion, said colored region consisting of a first portion permeating into the interior of the lens body, and a second portion protruding from said one of said front and back surfaces; and finishing said front and back surfaces by polishing said front and back surfaces so as to remove said second portion of said colored region and to smooth said front and back surfaces, thereby forming the hard contact lens, wherein the identifying mark is constituted by said first portion of said colored region.

2. A method of producing a hard contact lens according to claim 1, wherein said printing liquid is applied to said predetermined portion of said one of said front and back surfaces through a screen which is deposited thereon, said screen being patterned in the form of the identifying mark to be formed.

3. A method of producing a hard contact lens according to claim 1, wherein said organic solvent is selected from the group consisting of o-dichlorobenzene, 1,4-dioxane, toluene, methyl ethyl ketone, p-xylene, chloroform, acetone, methyl acrylate, methyl methacrylate, ethyl acrylate, ethyl methacrylate and tetrahydrofuran (THF).

4. A method of producing a hard contact lens according to claim 1, wherein said organic solvent is a polymeric organic solvent selected from the group consisting essentially of methyl acrylate, methyl methacrylate, ethyl acrylate, and ethyl methacrylate.

5. A method of producing a hard contact lens according to claim 4, wherein said printing liquid further contains a polymerization initiator for polymerizing said polymeric organic solvent.

6. A method of producing a hard contact lens according to claim 1, wherein said pigment consists of an oil-soluble dye selected from the group consisting of 1,4-Bis(isopropylamino) anthraquinone, 1-Methylamino-4-m-tolylaminoanthraquinone, and 1-Hydroxy-4-p-toluinoanthraquinone.

7. A method of producing a hard contact lens according to claim 1, wherein said printing liquid is prepared such that said pigment is added in an amount of 1–20 parts by weight per 100 parts by weight of the organic solvent.

8. A method of producing a hard contact lens according to claim 1, wherein said printing liquid further contains a binder selected from the group consisting of ethyl cellulose, silicone oil, and polyethylene glycol.

9. A method of producing a hard contact lens according to claim 1, wherein said identifying mark is formed in said front surface of the contact lens body.

10. A method of producing a hard contact lens adapted to be placed in direct contact with eye tissue, said hard contact lens being provided with an identifying mark in the form of a character, figure or symbol, comprising the steps of:

preparing a printing liquid by dissolving a pigment in an organic solvent which is permeable into a lens material for the hard contact lens, said pigment consisting of an oil-soluble dye selected from the group consisting of 1,4-Bis(isopropylamino) anthraquinone, 1-Methylamino-4-m-tolylaminoanthraquinone, and 1-Hydroxy-4-p-toluinoanthraquinone, said organic solvent consisting of methyl ethyl ketone or acetone, said printing liquid further containing ethyl cellulose as a binder;

machining a lens block to form a lens body having front and back surfaces;

applying said printing liquid to a predetermined portion of one of said front and back surfaces of the lens body, such that the printing liquid permeates into an interior of the lens body thereby to form a colored region on said predetermined portion, said colored region consisting of a first portion permeating into the interior of the lens body, and a second portion protruding from said one of said front and back surfaces; and finishing said front and back surfaces by polishing said front and back surfaces so as to remove said second portion of said colored region and to smooth said front and back surfaces, thereby forming the hard contact lens, wherein the identifying mark is constituted by said first portion of said colored region.

\* \* \* \* \*